Sept. 3, 1963 R. G. CLAPP 3,102,923
VARIATION OF CATHODE EMISSION AREA WITH SHIFT FROM MONOCHROME TO COLOR
Filed July 18, 1960
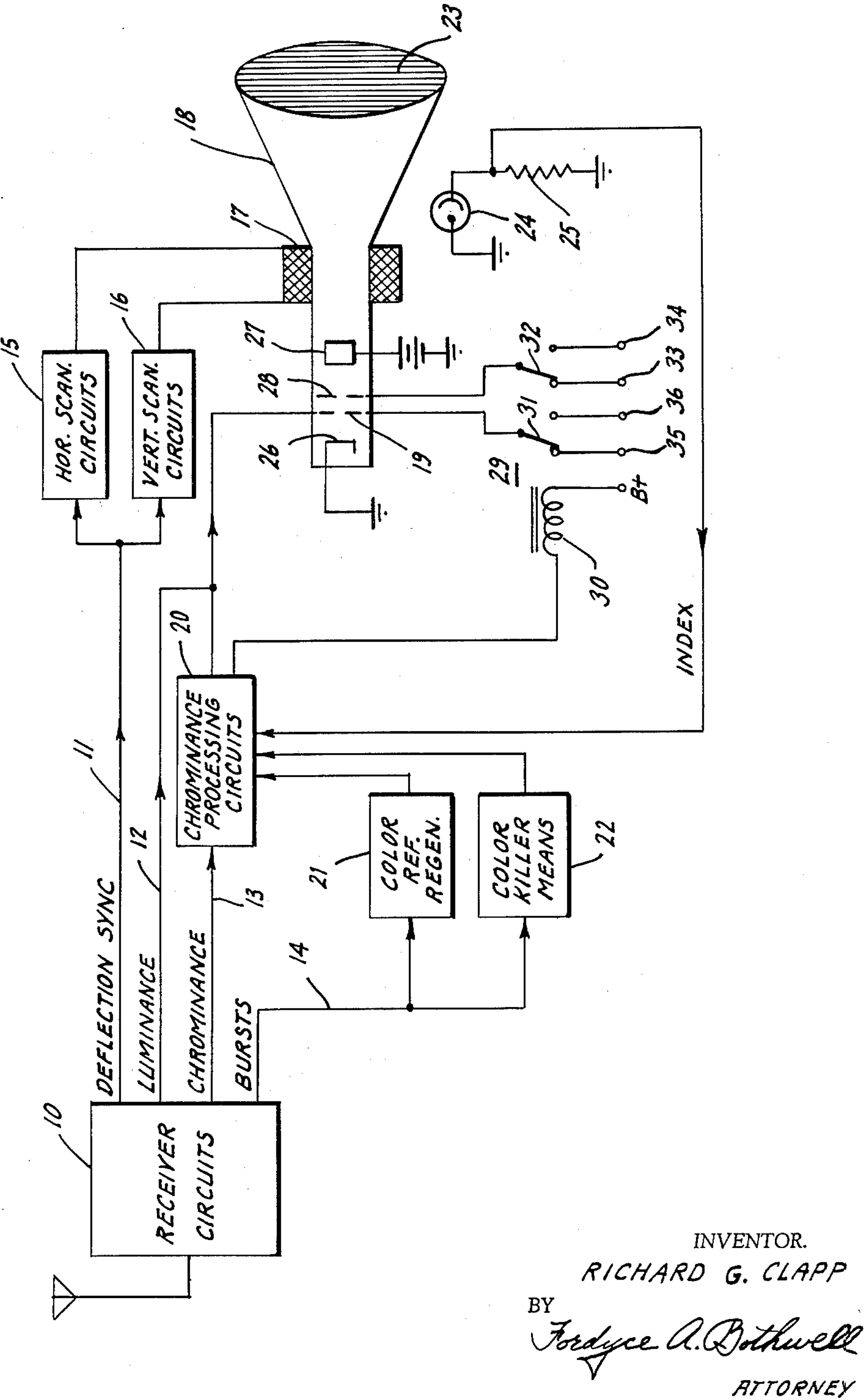
INVENTOR.
RICHARD G. CLAPP
BY
Fordyce A. Bothwell
ATTORNEY United States Patent Office 3,102,923

Patented Sept. 3, 1963

3,102,923

VARIATION OF CATHODE EMISSION AREA WITH SHIFT FROM MONOCHROME TO COLOR

Richard G. Clapp, Narberth, Pa., assignor, by mesne assignments, to Philco Corporation, Philadelphia, Pa., a corporation of Delaware Filed July 18, 1960, Ser. No. 43,650
6 Claims. (Cl. 178—5.4)

This invention relates to compatible color television receivers, i.e. receivers capable of receiving both color and monochrome signals. More particularly, this invention relates to receivers employing an image-producing cathode ray tube wherein a single image-producing electron beam modulated with the received signal impinges successive elements of the image screen.

An example of such a receiver is one employing a cathode ray tube whose image screen is provided with successive sets of phosphor stripes extending transversely to the direction of line scanning and capable of emitting light of different primary colors, e.g. red, green and blue, when the image-producing beam is modulated with a color signal.

In such a receiver, for accurate color reproduction it is desirable that the beam width be very narrow so that at any instant during production of a color image the beam will impinge on only one screen element emissive of light of a particular color and will not impinge simultaneously on elements emissive of light of different colors. This has necessitated drawing of the beam current from a very small area of the cathode, which heavily loads the cathode and tends to shorten the life of the cathode ray tube.

The principal object of the present invention is to alleviate this life-shortening tendency.

This invention is based on the recognition that (1) a compatible color television receiver is utilized during a great part of the time for reception of monochrome signals, and (2) the very narrow beam width required for accurate color reproduction in a receiver of the type here involved is not required for monochrome reproduction. In accordance with this invention, provision is made for establishing different widths of the electron beam so as to derive the beam from different-sized areas of the cathode for color and monochrome signals. This may be done by changing the voltage applied to an electrode of the electron gun, as hereinafter described. While it is contemplated by the invention that the changing of beam width may be performed either manually or automatically, it is much preferred to have this function performed automatically. In this latter respect the invention is further based on the concept of utilizing means already present in a compatible receiver for controlling the beam width-changing operation. Such means is the color killer means which detects whether a received signal is a color signal or a monochrome signal. As well understood, its normal function is to disable the chrominance channel when a monochrome signal is received. However, in the preferred form of this invention the color killer means is caused additionally to serve as a means for controlling the beam width-changing operation.

The invention may be fully understood from the following detailed description with reference to the accompanying drawing wherein the single figure is a diagrammatic illustration of a compatible color television receiver of the aforementioned type embodying a preferred form of this invention.

Referring more particularly to the drawing, block 10 represents the conventional receiver circuits by which the components of a received signal are derived. In the case of a color signal these components are the deflection synchronizing components derived at output connection

11, the luminance component derived at output connection 12, the chrominance component derived at output connection 13, and the bursts derived at output connection 14. In the case of a monochrome signal, the derived components comprise only the deflection synchronizing components and the luminance component.

In either case the deflection synchronizing components are supplied to the conventional horizontal and vertical scanning circuits represented at 15 and 16 which supply deflection currents to the deflection yoke 17 associated with the image-producing cathode ray tube 18. The luminance component is supplied to the control grid 19 which is an element of the electron gun within the cathode ray tube.

In the case of a color signal, the chrominance component is supplied to the chrominance processing circuits represented at 20, and the color writing signal derived therefrom is supplied to the control grid 19. The bursts are supplied to the color reference regenerator represented at 21 and also to the color killer means represented at 22.

In the type of system here involved, the image screen 23 of the cathode ray tube 18 comprises elements preferably in the form of stripes as hereinbefore mentioned. In this type of system, it is necessary to derive an index signal which is utilized during reception of a color signal to effect coordination between instantaneous position and instantaneous modulation of the electron beam as well understood in the art. The index signal preferably is derived by emission of invisible light from index elements on screen 23, such light being received by a photocell 24 which produces the index signal across resistor 25. It will be understood, of course, that the index signal may be derived in any other suitable manner, such as by secondary electron emission.

The color reference signal from the color regenerator 21 and the index signal derived from across resistor 25 are supplied to the chrominance processing circuits 20 where they are utilized to produce the color writing signal as well understood.

The color killer means 22 detects the presence or absence of the bursts, and it thus detects whether a received signal is a color signal or a monochrome signal. In the absence of the bursts, the color killer means disables the color processing circuits.

As thus far described, the system is known. As previously stated, in this type of system employing a single image-producing beam, for accurate color reproduction it is necessary that the width of the beam be very narrow. The electron gun comprises, in addition to the control grid 19, a cathode 26 and an anode 27. To establish a very narrow width of the beam, it is necessary to draw the beam current from a very small area of the cathode 26. This has been done by providing a small grid aperture, by providing close spacing of the cathode and the grid, and by providing a high anode potential. However, drawing the beam current from a very small area of the cathode heavily loads the cathode and tends to shorten the life of the cathode ray tube.

In accordance with the present invention, this life-shortening tendency is alleviated by widening the beam so as to draw the beam current from a larger area of the cathode during reception of monochrome signal when the very narrow beam width is not required. In the illustrated embodiment, the electron gun is provided with a screen grid 28, and provision is made for changing the positive voltage applied to this grid. If the screen grid voltage is caused to be substantially lower, e.g. several hundred volts lower, during monochrome signal reception than it is during color signal reception, the width of the beam is substantially increased during monochrome signal reception so that the beam current is drawn from a larger area of the cathode. In order to maintain the same beam current, provision is made for applying different voltages to the control grid in inverse relation to the voltages applied to the screen grid. Thus when the screen grid voltage is lowered, the control grid voltage is made less negative and vice versa.

In the illustrated embodiment the different voltages are selected by switching means represented at 29, and the latter is controlled by the color killer means 22. Thus during reception of a color signal, a relatively high voltage is applied to the screen grid 28, and during reception of a monochrome signal a substantially lower voltage is applied to the screen grid. And whenever the screen grid voltage is changed, the control grid voltage is changed in inverse relation.

In the illustrated embodiment the switching means 29 is a relay comprising a winding 30 and double-throw switch contacts 31 and 32. The voltages to be applied to the screen grid 28 are provided at terminals 33 and 34, while the voltages to be applied to the control grid 19 are provided at terminals 35 and 36. The relay winding may be included in series in the output circuit of a chroma amplifier controlled by the color killer means. Then as long as the bursts are present and the chroma amplifier is operative, the relay will be energized to apply a relatively high voltage to the screen grid 28 and a certain negative voltage to the control grid 19. However, when the bursts are absent and the chroma amplifier is disabled by the color killer means, the relay will be deenergized to apply a substantially lower voltage to the screen 28 and to apply a less negative voltage to the control grid 19.

When it is considered that at the present time most television transmissions are monocrome and they probably will be for some years to come, it is readily appreciated that the present invention is effective greatly to alleviate the tendency toward shortening of the life of the cathode ray tube in a receiver of the type here involved.

While a preferred embodiment of the invention has been illustrated and described, it will be understood that the invention is not limited thereto but contemplates such modifications and further embodiments as may occur to those skilled in the art.

I claim:

1. In a color television receiver capable of receiving both color and monochrome signals, a cathode ray tube having a screen comprising elements arranged for successive impingement by an electron beam and an electron gun for producing said beam, said gun comprising a cathode, a control grid, a screen grid and an anode, means for applying to said screen grid a relatively high positive unidirectional voltage of predetermined constant amplitude such that electron beam current is drawn from a very small area of said cathode to establish a very narrow beam width, and means for applying a substantially lower positive unidirectional voltage of predetermined constant amplitude to said screen grid whenever a monochrome signal is received, thereby to cause the electron beam current to be drawn from a larger area of said cathode during monochrome reception.

2. In a color television receiver capable of receiving both color and monochrome signals, a cathode ray tube having a screen comprising elements arranged for successive impingement by an electron beam and an electron gun for producing said beam, said gun comprising a cathode, a control grid, a screen grid and an anode, a relay, means including contacts on said relay for applying to said screen grid a relatively high positive voltage such that electron beam current is drawn from a very small area of said cathode to establish a very narrow beam width, means for detecting reception of a monochrome signal, means for effecting control of said relay by said detecting means, and means including contacts on said relay for applying a substantially lower positive voltage to said screen grid whenever a monochrome signal is received, thereby to cause the electron beam current to be drawn from a larger area of said cathode during monochrome reception.

3. In a color television receiver capable of receiving both color and monochrome signals, a cathode ray tube having a screen comprising elements arranged for successive impingement by an electron beam and an electron gun for producing said beam, said gun comprising a cathode, a control grid, a screen grid and an anode, means for applying to said screen grid a relatively high positive voltage such that electron beam current is drawn from a very small area of said cathode to establish a very narrow beam width, means for applying a substantially lower positive voltage to said screen grid whenever a monochrome signal is received, thereby to cause the electron beam current to be drawn from a larger area of said cathode during monochrome reception, and means for maintaining said beam current substantially the same for both of said screen grid voltages.

4. In a color television receiver capable of receiving both color and monochrome signals, a cathode ray tube having a screen comprising elements arranged for successive impingement by an electron beam and an electron gun for producing said beam, said gun comprising a cathode, a control grid, a screen grid and an anode, means for applying to said screen grid a relatively high positive voltage such that electron beam current is drawn from a very small area of said cathode to establish a very narrow beam width, means for applying a substantially lower positive voltage to said screen grid whenever a monochrome signal is received, thereby to cause the electron beam current to be drawn from a larger area of said cathode during monochrome reception, and means for applying different voltages to said control grid during application of said different screen grid voltages so as to maintain said beam current substantially constant.

5. In a color television receiver capable of receiving both color and monochrome signals, a cathode ray tube having a screen comprising elements arranged for successive impingement by an electron beam and an electron gun for producing said beam, said gun comprising a cathode, a control grid, a screen grid and an anode, means for applying to said screen grid a relatively high positive voltage such that electron beam current is drawn from a very small area of said cathode to establish a very narrow beam width, means for detecting reception of a monochrome signal, means controlled by said detecting means for applying a substantially lower positive voltage to said screen grid whenever a monochrome signal is received, thereby to cause the electron beam current to be drawn from a larger area of said cathode during monochrome reception, and means also controlled by said detecting means for maintaining said beam current substantially the same for both of said screen grid voltages.

6. A color television receiver according to claim 5, wherein said last means applies different voltages to said control grid during application of said different screen grid voltages.

References Cited in the file of this patent

UNITED STATES PATENTS 2,713,606 Sziklai ---------------- July 19, 1955